United States Patent [19]

Hart et al.

[11] Patent Number: 5,041,825

[45] Date of Patent: Aug. 20, 1991

[54] REMOTE CONTROL SYSTEM FOR COMBINED CEILING FAN AND LIGHT FIXTURE

[75] Inventors: Edward F. Hart, Yorba Linda; William B. McDonough, Anaheim Hills, both of Calif.

[73] Assignee: Casablanca Industries, Inc., City of Industry, Calif.

[21] Appl. No.: 431,156

[22] Filed: Nov. 3, 1989

[51] Int. Cl.[5] .......... H04M 11/04

[52] U.S. Cl. .......... 340/825.06; 340/825.22; 340/825.69; 318/16; 98/40.07

[58] Field of Search .......... 340/825.06, 825.69, 340/825.72, 825.22, 825.57, 310 A, 310 R, 309.4, 309.5, 309.15, 825.07, 825.08, 825.15, 825.17, 539, 501; 341/176; 455/352, 603, 353; 318/16, 281, 256, 283, 480; 98/40.05, 40.07

[56] References Cited

U.S. PATENT DOCUMENTS

| | | | |
|---|---|---|---|
| 4,371,814 | 2/1983 | Hannas | 318/16 |
| 4,621,992 | 11/1986 | Angot | 340/825.69 |
| 4,689,533 | 8/1987 | Yang | 318/281 |
| 4,716,409 | 12/1987 | Hart et al. | 340/825.22 |
| 4,719,446 | 1/1988 | Hart | 340/310 A |
| 4,818,920 | 4/1989 | Jacob | 340/825.57 |
| 4,935,736 | 6/1990 | Meierdierck | 340/825.72 |

*Primary Examiner*—Donald J. Yusko

*Assistant Examiner*—Dervis Magistre

*Attorney, Agent, or Firm*—Charles H. Schwartz; Ellsworth R. Roston

[57] ABSTRACT

A control unit for a combined ceiling fan and light fixture (ceiling unit) is coupled to a temperature sensor monitoring the temperature of the room containing the ceiling unit, has manual entry keys for controlling fan energization, speed and direction and light energization and intensity and for selecting a mode of operation, and has a first microprocessor for controlling a radio transmitter to transmit a command bit sequence. The transmitted signal is received by the ceiling unit where a second microprocessor responds to the command bit sequence to control the firing of one of several triacs controlling fan energization, speed and direction and to control light energization and intensity. In an "auto-speed" mode, fan speed responds to changes in room temperature. In a "winter mode", the fan blows upwardly at a slow speed, the speed being momentarily increased periodically to break up stratification. Two control units at different locations in the room may be used to control the ceiling unit, which responds only to the control unit which last transmitted a manual command in response to key activation. An update is transmitted hourly, if all fan and light functions are off, or every ten minutes, if a function is on, the update timer being reset whenever a new command is transmitted.

13 Claims, 15 Drawing Sheets

REMOTE CONTROL SYSTEM FOR COMBINED CEILING FAN AND LIGHT FIXTURE

BACKGROUND OF THE INVENTION

1. Field of the Invention

This invention relates to an improved remote control system for a combined ceiling fan and light fixture and, more particularly, to a system of this type using a radio frequency link, microprocessor control, and a number of special features.

2. Description of the Prior Art

Ceiling fans are often combined with light fixtures, and it is desirable to provide remote control means for controlling fan speed and direction as well as light intensity. One such remote control system is shown in U.S. Pat. No. 4,719,446, issued Jan. 12, 1988 to Edward F. Hart. This system uses existing house wiring to couple control signals from a wall mounted control unit to control the speed of the fan and the intensity of the light. However, systems of this character require access to an AC line by replacing a wall switch and are subject to line noise. Such systems are difficult to operate in that fan and light operations are sometimes confused. Moreover, the prior art systems do not readily lend themselves to the incorporation of special features. Fan motors of the prior art are typically connected across an AC power supply through triacs which, in conventional practice, are triggered continuously. The commutating effect of back EMF from the motor causes the triac to go to zero at some point other than true AC zero cross, thus causing the triac to fall out of conduction. Although continuous triggering is effective, the prior art fan motors tend to have high power dissipation causing the motor to run hot.

SUMMARY OF THE INVENTION

According to the present invention, a combined ceiling fan and light fixture unit is controlled from a remote control unit transmitting a digital signal. The control unit includes a first microprocessor controlling a radio transmitter. A temperature sensor monitoring the temperature in the room containing the combined ceiling fan and light fixture provides an input to the first microprocessor. Manual entry means, such as a key pad, is coupled to the first microprocessor for turning the fan and light on or off, controlling fan speed and direction and light intensity and selecting a mode of operation. The transmitted digital signal comprises a number of control bits including light fixture control bits for controlling light energization and intensity level and fan control bits for controlling the energization, speed and direction of the fan.

The combined ceiling fan and light fixture (hereinafter the "ceiling unit") includes a radio receiver which receives the transmitted digital signal and provides a data signal corresponding to the digital signal to a second microprocessor. The second microprocessor controls light energization and intensity level, in accordance with the light fixture control bits and fan energization, direction and speed in accordance with the fan control bits.

It is sometimes convenient to employ two control units at different locations in a room to control the same ceiling unit or units. Because the control units operate autonomously, there is a problem when the fan units receive conflicting commands at random times. According to the invention, this problem is solved by providing a special bit (an "A/B" bit) in the control code stream to identify the control unit transmitting the signal and a "manual/automatic" bit in the control code stream to identify whether a command is a manual command input through the manual entry means or an automatic command derived from temperature sensor readings. The second microprocessor then controls the ceiling unit to respond to the control unit which was last operated manually.

For complete recovery from power failures and to boost the accuracy of the system to simulate a closed loop controller's accuracy, the control unit transmits an update every hour, if no functions are requested (fan, light and features "off"). When any function or component is "on", updates are transmitted every ten minutes. Any time a transmission is called for by a temperature change or by manual operation, the update timer within the second microprocessor is reset.

In order to provide draft-free recirculation of heated air in winter, a "winter" mode is provided in this mode, the second microprocessor controls fan operation to provide upward airflow at low speed. Every five minutes, the fan speed is increased for ten seconds before returning to the low speed. This is just enough to break up stratification, while the low speed keeps the air moving gently so as not to create a draft.

For controlling fan speed in response to temperature changes in the room as sensed by the temperature sensor, an "auto-speed" mode is provided. The control unit tests room temperature every thirty seconds. Every two minutes, a temperature determination is updated with the average of the last three readings. This determined temperature is compared to a base temperature and a target speed is computed from the temperature difference. If the fan speed is not then at the target speed, a command is transmitted to change fan speed to the target speed.

The system of the invention also can operate in "security", "power saver" and "test" modes.

In the ceiling unit, the second microprocessor controls triacs which determine fan direction and speed. As mentioned above, it is the conventional practice to trigger the triacs continuously. The power consumption of continuous triggering is substantially reduced, according to the invention, by triggering the triacs just before the time of zero crossing of the AC power supply through a short period ending just after the time of zero crossing to make sure the triac is solidly on throughout the period of commutating effects. The triggering current is then removed until just before the next zero crossing.

BRIEF DESCRIPTION OF THE DRAWINGS

A clearer understanding of the present invention will be apparent from the following description and drawings, wherein.

DESCRIPTION OF THE PREFERRED EMBODIMENT

Figure 1:
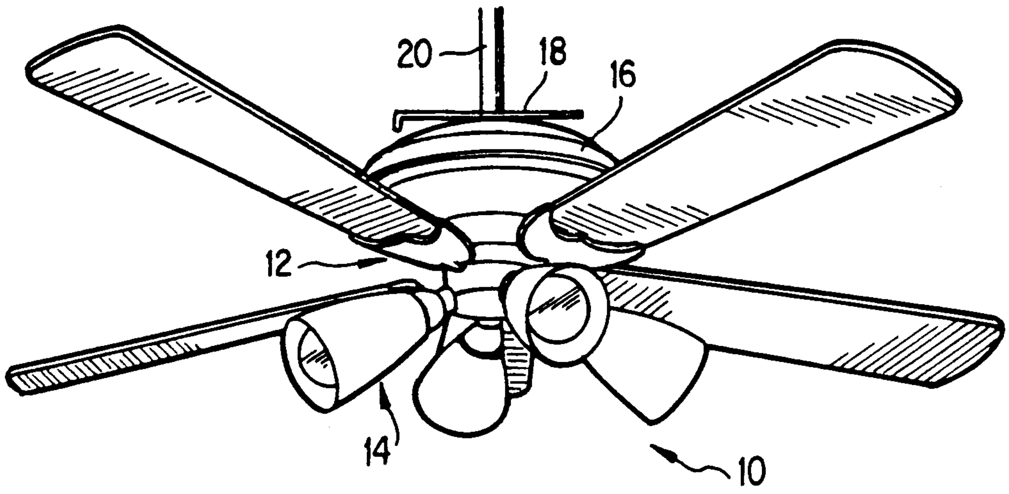
FIG. 1 is a perspective view of a ceiling unit controlled by the system of the invention.

As shown in FIG. 1, a ceiling unit 10, which is controlled by the remote control system of the invention, is a combined ceiling fan 12 and light fixture 14. A fan housing 16 contains the fan motor and ceiling unit circuitry which, under the control of a control unit to be described more fully below, governs the energization, speed and direction of the fan and the energization and intensity of the lamps in the light fixture. The ceiling unit circuitry includes a radio receiver, the antenna 18 for which is mounted at the top of fan housing 16. Ceiling unit 10 may be suspended from the ceiling on an extension pole 20.

Figure 2:
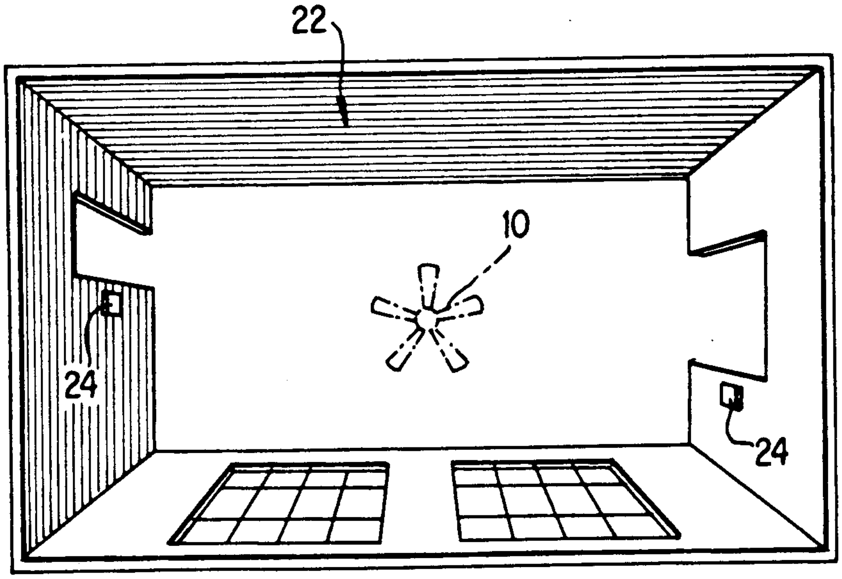
FIG. 2 is a symbolic plan view of a room containing a ceiling unit controlled by two control units of the invention at different locations.

As illustrated in FIG. 2, ceiling unit 10 is typically mounted in the center of a room 22. For convenience, remote control units 24, which control ceiling unit 10, are located at opposite ends of room 22. As will be explained below, the ceiling unit is controlled by the control unit from which a manual command was most recently transmitted.

Figure 3:
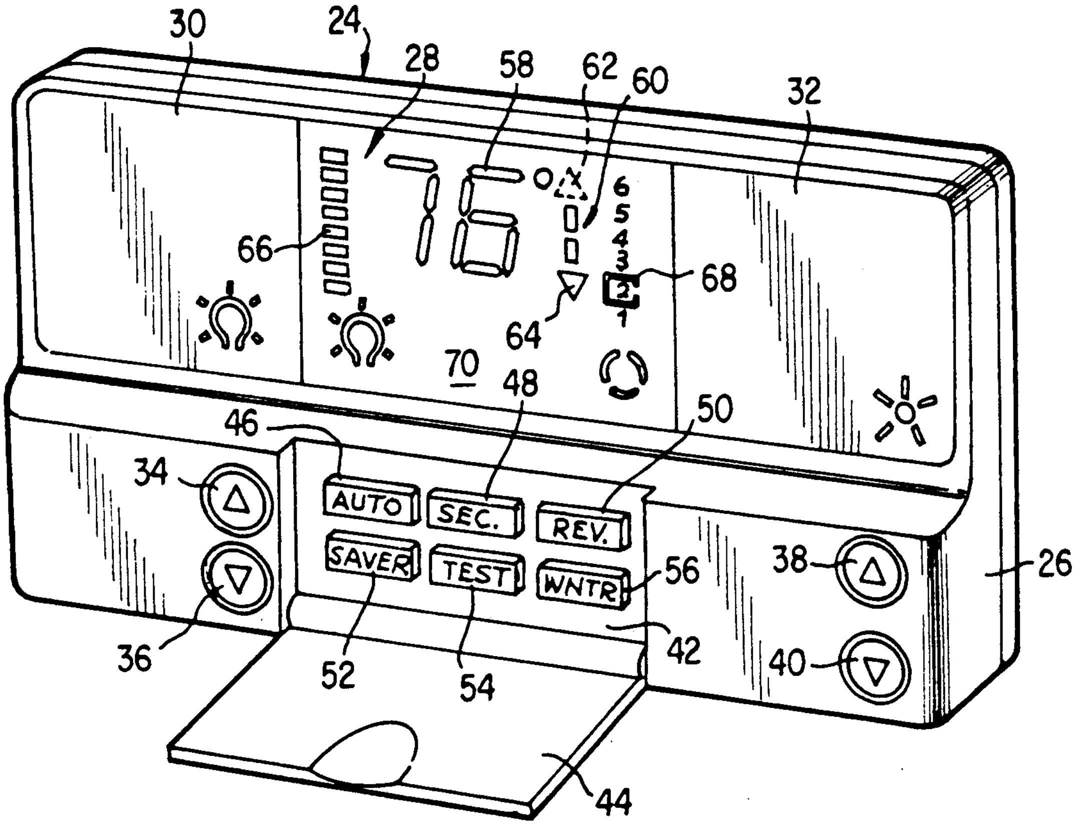
FIG. 3 is a perspective view of a control unit of a system of the invention.

Each control unit 24, as shown in FIG. 3, comprises a housing 26 containing a display panel 28 and a number of manually actuable buttons or keys constituting manual entry means. Button 30 is a light "on/off" button, alternate actuation of which turns lights on and off. Similarly, alternate actuation of a fan "on/off" button 32 turns fan 23 on and off. Light intensity is controlled by "light up" button 34 and "light down" button 36 which, respectively, control the transmission of commands to increase and decrease light intensity. Fan speed is controlled by "speed up" button 38 for increasing fan speed and "speed down" button 40 for lowering fan speed. A "special features" panel 42 is normally covered by a hinged control panel door 44 shown in the open position in FIG. 3. The six buttons on "special features" panel 42 include an "auto" button 46, the actuation of which places the system in an "auto-speed" or automatic-speed mode. In this mode, the temperature in the room controls the speed of the fan motor as will be explained below. Actuation of "security" button 48 places the system into a security mode for automatically turning the light on and off in a random pattern designed to give the home a lived-in look. When a "reverse" button 50 is pressed, the control unit transmits a command to ceiling unit 10 to reverse the airflow direction of the fan. Operation of "saver" button 52 puts the system in a saver mode which automatically turns the lights off one hour after they are turned on. An audio tone is actuated to warn an occupant of the room before the lights are turned off. By actuating "saver" button 52, again, the occupant can cancel the saver mode. This feature is useful for rooms where lights tend to be left on and is handy when children prefer that lights be left on at bedtime. "Test" button 54 puts the system in a test mode. This initiates a ninety second test program which fully tests all fan and light functions. A winter mode may be selected by "winter" button 56 for providing draft-free recirculation of heated air.

Display panel 28 is a liquid crystal display. The temperature in the room as measured by a temperature sensor is displayed at 58. Airflow direction is displayed by an arrow 60 by displaying an "up" arrow head 62 when airflow is up and "down" arrow head 64 when airflow is down. The light intensity is displayed by one of a series of light intensity indicators 66, and fan speed is displayed by energizing a cursor 68 surrounding a numeral indicating one of six fan speeds. The portion 70 of display panel displays the name of the mode selected by mode selection buttons 46, 48, 52, 54 and 56.

Figure 4:
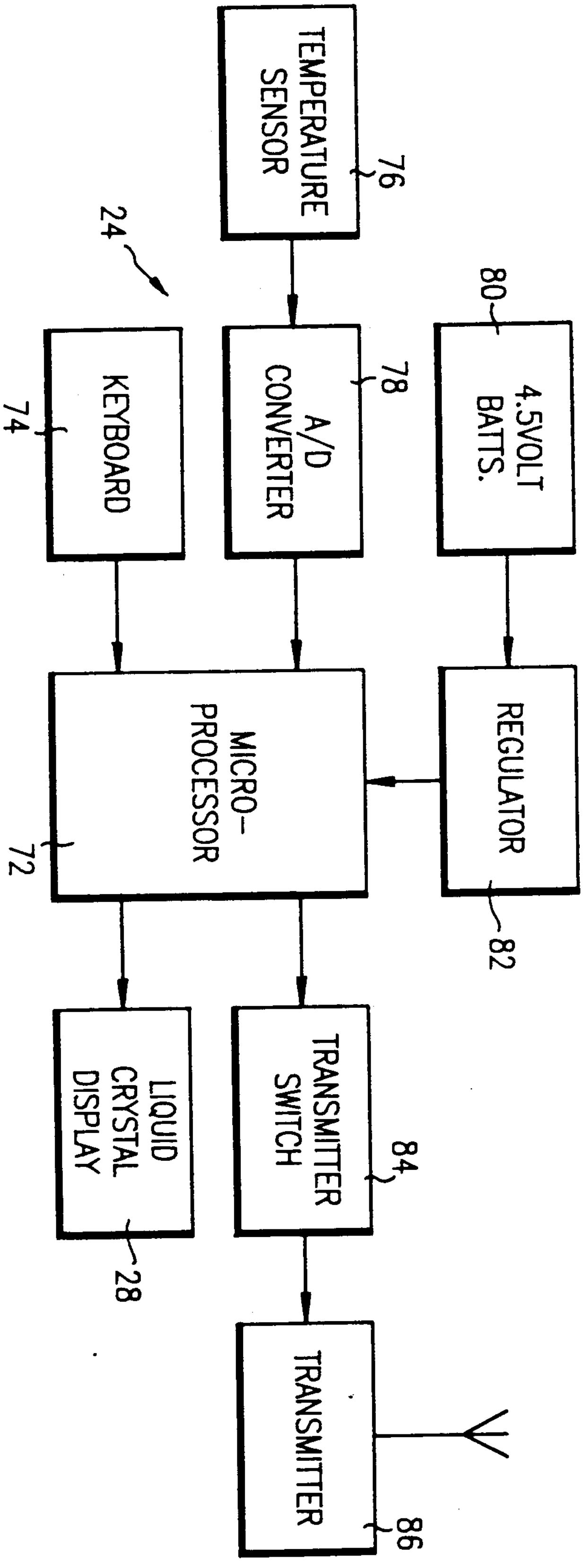
FIG. 4 is a block diagram of a control unit of a system of the invention.

As shown in the block diagram of FIG. 4, control unit 24 includes a microprocessor 72. The switch buttons which are shown in FIG. 3 constitute manual entry or keyboard means 74 providing inputs to microprocessor 72. An analog temperature sensor 76 measure the temperature in room 22, and this measurement is converted to digital form in A/D converter 78 providing another input to microprocessor 72. Power for the components of control unit 24 is supplied by 4.5 bolt batteries 80 through voltage regulator 82. Microprocessor 72 drives liquid crystal display panel 28. When the system is in the "auto-speed" mode, microprocessor 72 formulates "automatic" commands. In response to actuation of the manual switch buttons of keyboard means 74, "manual" commands are developed by microprocessor 72. These commands are incorporated in a twenty-four bit command sequence, shown in FIG. 6, assembled in appropriate registers of microprocessor 72. A transmitter switch 84 is actuated in response to the command sequence received from microprocessor 72 to drive radio transmitter 86.

Figure 6:
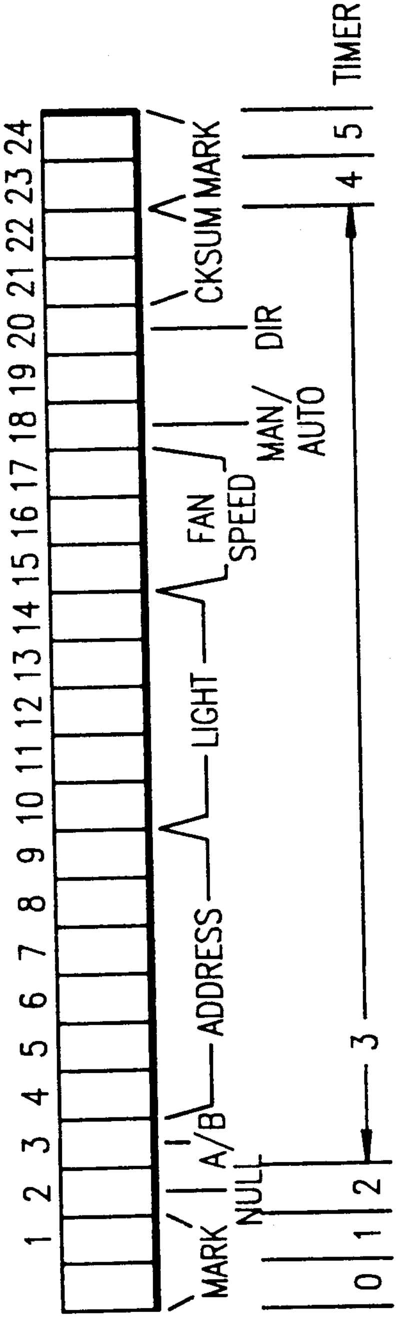
FIG. 6 is a diagram illustrating the transmitted command bit stream of the transmitted digital signal used in a system of the invention.

Turning to FIG. 6, the twenty-four bit command sequence includes address bits 4–9 for transmitting the address of the ceiling unit to be controlled. This is important when for example, similar systems are used in adjacent rooms to avoid controlling the wrong ceiling unit. Bits 10–14 are used as commands for light energization and level. Bits 15–17 command fan energization and speed, while bit 20 governs airflow direction. Bit 3 signifies which of two control units A and B is transmitting the signal, and bit 18 informs the ceiling unit whether the transmitted command is "manual"—that is, responsive to actuation of one or more of the switch buttons of keyboard 74—or "automatic"—that is, responsive to a change in temperature as measured by temperature sensor 76.

Figure 7:
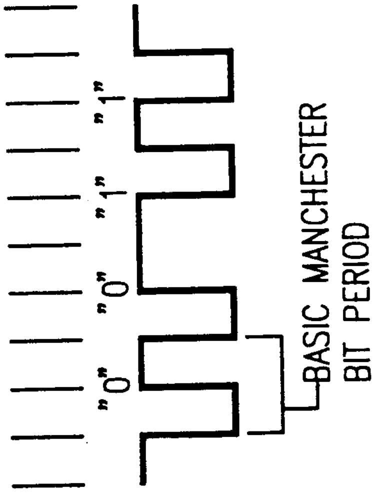
FIG. 7 is a wave form illustrating the coding scheme used in the transmitted digital signal.

Manchester coding is used in transmitting the command sequence. As shown in FIG. 7, a "0" is represented by a negative half cycle followed by a positive half cycle, while a "1" is represented by a positive half cycle followed by a negative half cycle.

Figure 5:
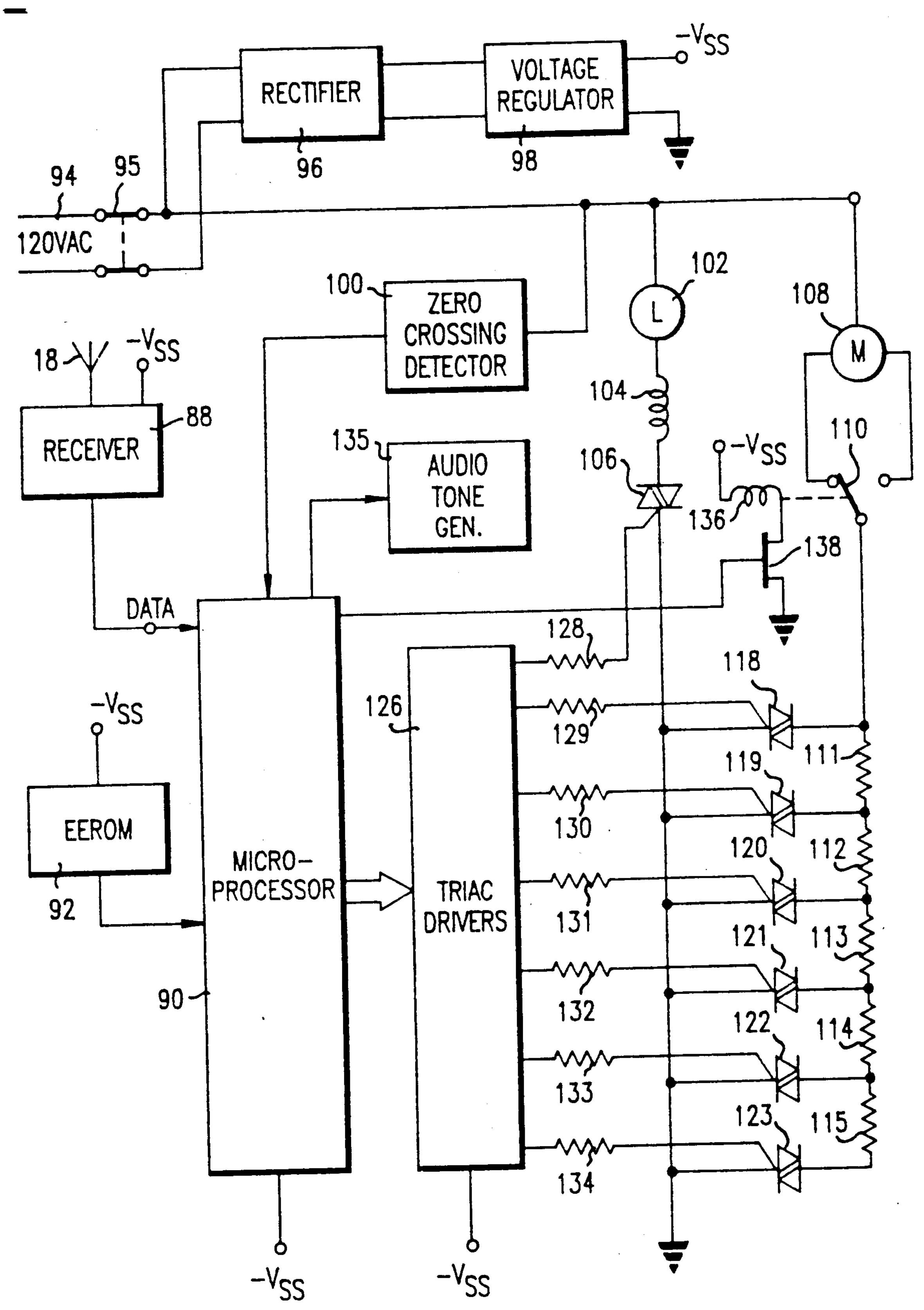
FIG. 5 is a block and schematic circuit diagram of a ceiling unit of a system of the invention.

Turning to FIG. 5, ceiling unit 10 includes a radio receiver 88 connected to antenna 18. The receiver detects the command sequence as a data signal applied as an input to a second microprocessor 90. An EEROM 92 stores the address code for ceiling unit 10 and provides the address code as an input to microprocessor 90 where it is compared with the address code received in the command sequence. A 60 Hz. 120 Volt AC supply 94 is applied through an on-off switch 95 and feeds a rectifier 96 which through voltage rectifier 98 supplies a DC voltage source $-V_{SS}$. A zero crossing detector 100 senses the time the AC wave of supply 94 crosses zero and provides an input to microprocessor 90. Lights 14, as a group, form a lighting load 102 connected across AC supply 94 through an inductor 104 and a triac 106. Fan motor 108 is also connected across AC supply 94 through a reversing switch 110 and resistors 111, 112, 113, 114 and 115 in series. A triac 118 connects reversing switch 110 to ground, while triacs 119, 120, 121 and 122 are connected respectively, from the junctions between resistors 111 and 112, 112 and 113, 113 and 114, and 114 and 115 to ground. Triac 123, in turn, connects the lower end of resistor 115 to ground. Microprocessor 90 develops trigger signals applied through triac drivers 126 and coupling resistors 128, 129, 130, 131, 132, 133 and 134, respectively, to triacs 106 and 118–123. Reversing switch 110 is controlled by relay 136 which is controlled by an FET switch 138 triggered by a signal from microprocessor 90.

The firing of one of triacs 118–123 selects how many, if any, of resistors 111–115 are in series with fan motor 108. By thus controlling the resistance in series with fan motor 108, triacs 118–123 control the current and, hence, the speed of fan motor 108.

Although triacs are conventionally triggered continuously, it has been found that power consumption can be reduced, with a reduction of operating temperature and an increase in reliability, by triggering triacs 118–123 just before the time of zero cross as determined by zero crossing detector 100, and for a short period just after the time of zero cross. This places the triacs solidly on throughout the period of commutating effects with the triggering current removed for the duration of the half cycle. Not only does this reduce power consumption, but a lower cost circuit can be used.

Figure 8:
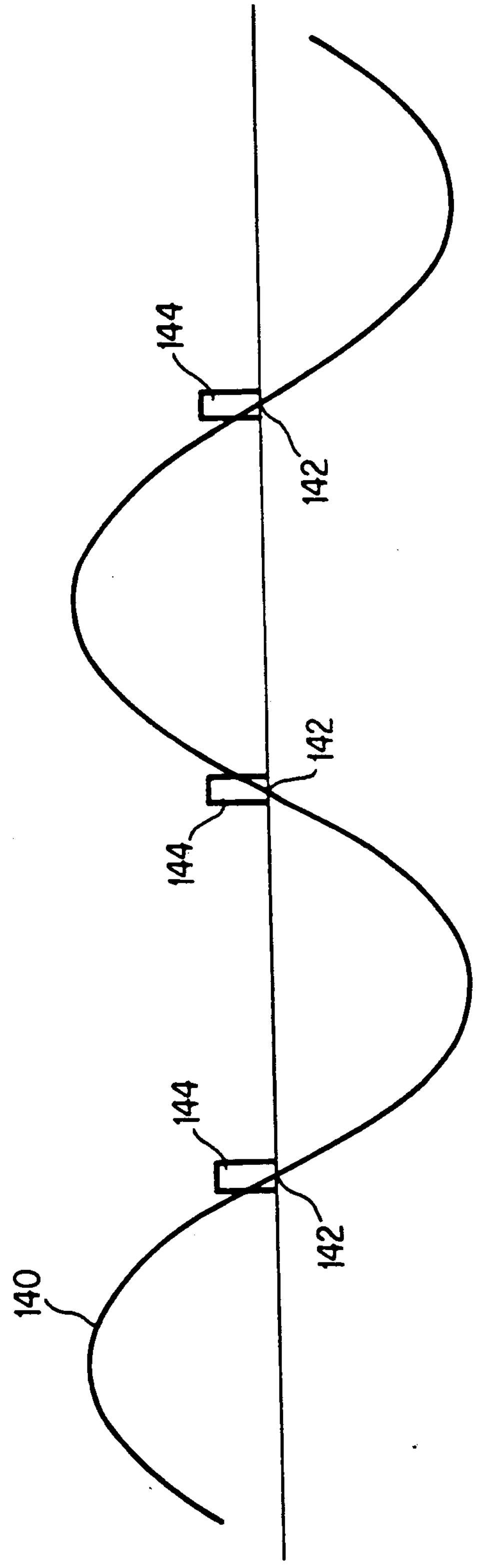
FIG 8 is a wave form illustrating the triggering of triacs in the system of the invention.

The timing of the triggering signal is illustrated in FIG. 8. AC wave 140 has zero crossing points 142. Trigger pulses 144 commence just before zero crossing points 142 and terminate just after the zero crossing points. In particular, trigger pulses 144 are one microsecond pulses which commence 0.5 microsecond before zero crossing points 142. The timing of the trigger pulses is computed from the timing of the previous zero crossing points.

Light intensity is controlled by controlling the duty cycle of triac 106. Microprocessor 90 computes the duty cycle required in response to the fan speed bits in the command sequence as represented in the data signal from receiver 88.

As will be explained below in connection with the description of the operation of the saver mode, an audio warning tone is sounded just before the lights are extinguished. The audio tone generator and transducer are shown at 135, being triggered by a signal from microprocessor 90.

Figure 9A:
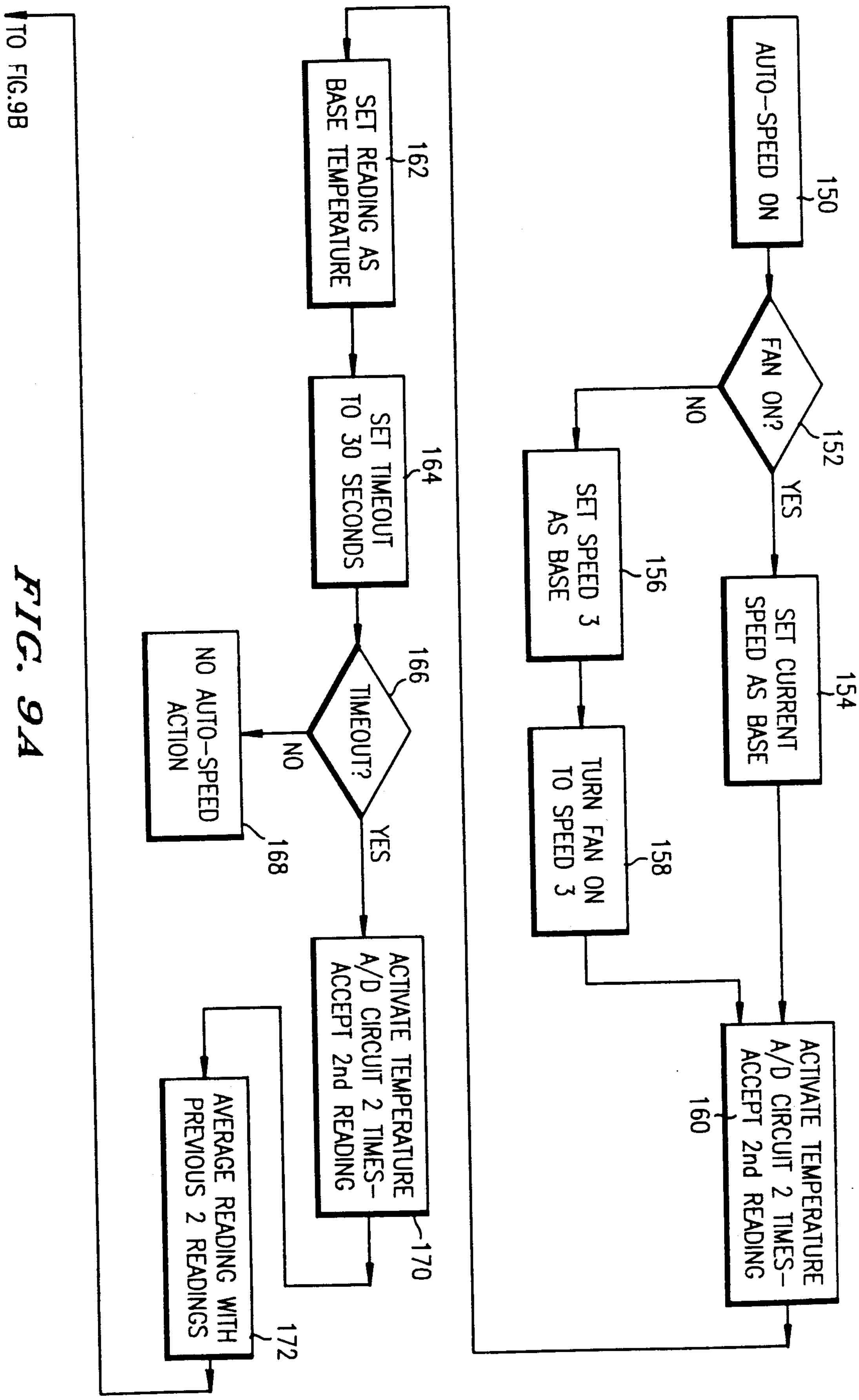
FIGS. 9A, 9B, 10A, 10B, 10C, 10D, 11, 12 and 13 are flowcharts illustrating the programming and operation of the microprocessors of a system of the invention.
Figure 9B:
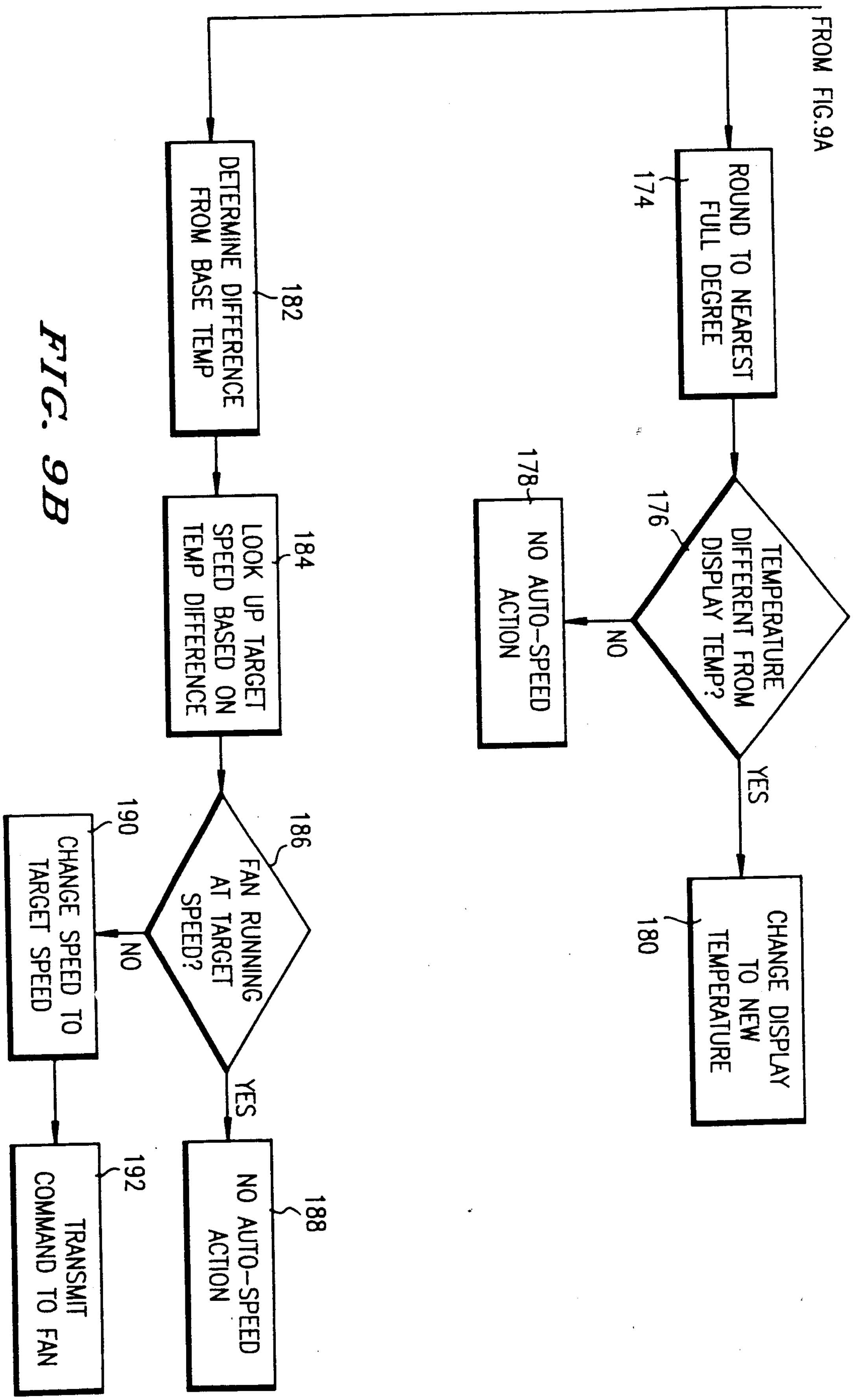

Operation in the auto-speed mode is illustrated in the flow chart of FIGS. 9A and 9B. If the auto-speed mode is on (selected by switch button 46) as indicated at 150, it is determined at 152 whether the fan is on or off. If the fan is on, the current speed of the fan is set at 154 as a base speed. If the fan is off, fan speed 3 is set as the base speed at 156; and the fan is turned on to fan speed 3 at 158. When the current speed is set as the base speed at 154 or the fan is turned on to fan speed 3 at 158, temperature sensor 78 and A/D converter 78 are activated two times at 160 and the second reading is accepted. This temperature reading is then set as the base temperature at 162. A timer is set for thirty seconds at 164 and monitored at 166. If the thirty second timeout has not been reached, no action is taken at 168. If a timeout is sensed, temperature sensor 76 and A/D converter 78 are activated two times at 170; the second reading is accepted at 172; and this reading is averaged with the previous two readings. At 174, this average is rounded to the nearest full degree. Every two minutes, it is determined at 176 whether the temperature is different from the temperature displayed on display panel 28. If it ia not different, no action is taken as indicated at 178. If, however, there is a temperature difference, temperature display 58 on display panel 28 is changed to the new temperature as indicated at 180. Meanwhile, at 182 the difference between the average temperature at 172 and the base temperature is determined. Based on the temperature difference, at 184 a target speed is looked up. It is then determined at 186 whether the fan is running at the target speed. If yes, no auto-speed correction is required as indicated at 188. If no, a command to change the speed to the target speed is developed at 190 for incorporation in the command sequence and transmitted at 192 to ceiling unit 10. This will result in the triggering of one of triacs 118–123 corresponding to the commanded speed.

As will be apparent from the above, the reference, or base, temperature/speed relationship is set by the user when a desired fan speed is selected at the current room temperature. After setting, the fan speed will change automatically up or down based on changes in sensed room temperature. For each 1.5° F. upward change, the fan speed increases one speed setting (of a total of six). Conversely, each 1.5° F. downward change causes the fan speed to reduce one speed setting. The temperature can fall enough to cause the fan to turn completely off. In this situation, the auto-speed mode indication in area 70 of display panel 28 will flash to remind the user that the fan will come on automatically when room temperature increases.

Figure 10A:
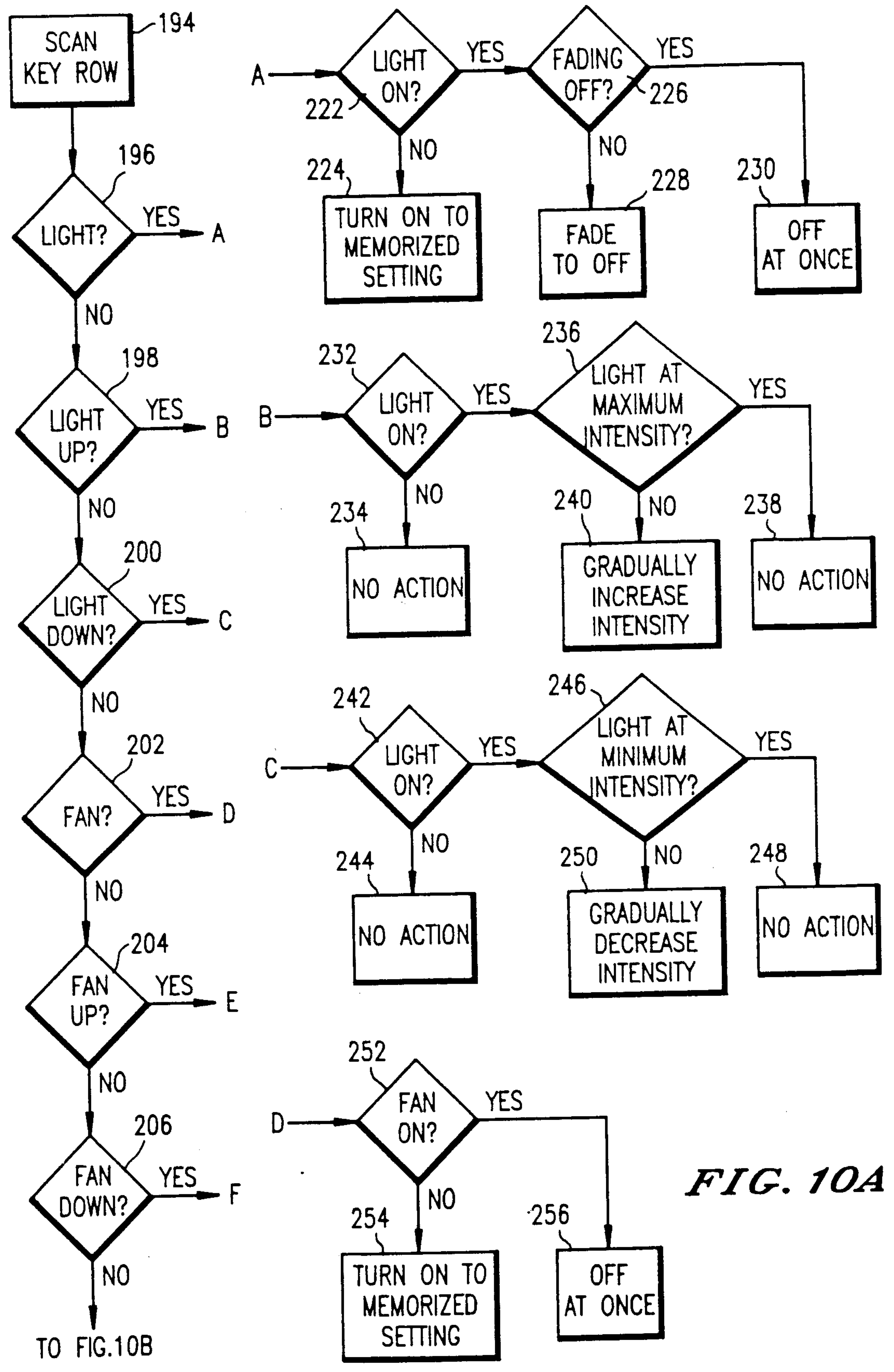
Figure 10B:
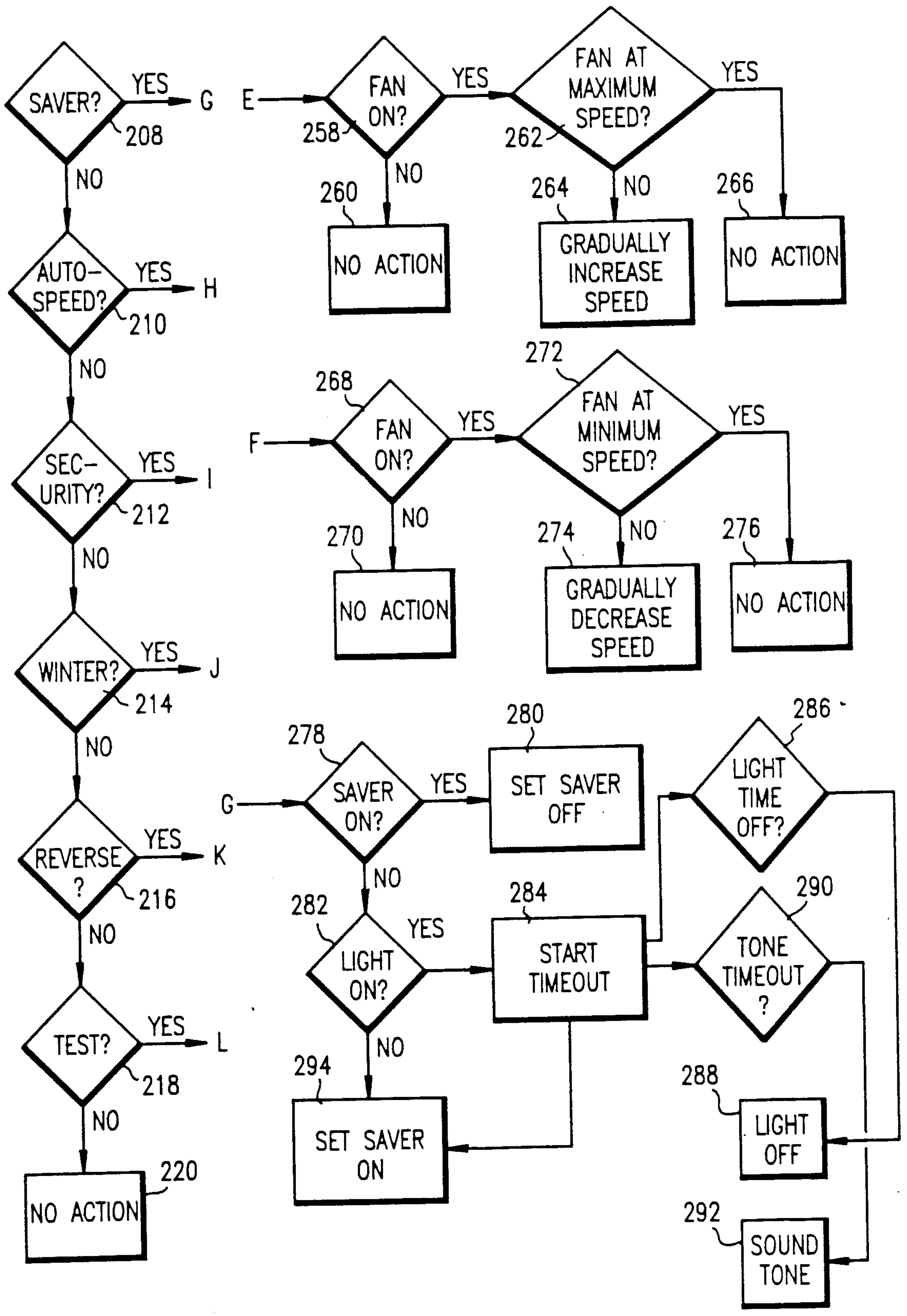

The general operation of the system is shown in the flow charts of FIGS. 10A, 10B, 10C and 10D. As indicated in FIG. 10A at 194, the system scans the status of the keys of a key row formed, in the order listed, of switch buttons 30, 34, 36, 32, 38, 40, 52, 46, 48, 56, 50 and 54. At 196, it is determined whether light switch 30 is actuated. If yes, branch A to be described below is executed. If no, it is determined at 198 whether light up switch 34 is actuated. If yes, branch B (described below) is executed. If no, it is determined at 200 whether light down switch 36 is actuated. If yes, branch C (described below) is executed. If no, at 202 it is determined whether fan switch 32 is actuated. If yes, branch D is executed as described below. If no, it is decided at 204 whether increase fan speed switch 38 is actuated. If yes, branch E is executed as described below. If no, whether decrease fan speed switch 40 is actuated is decided at 206. If yes, branch F is executed as will be explained below. If no, turning to FIG. 10B, it is determined at 208 whether saver mode switch 52 is actuated. If so, branch G is executed as will be explained. If no, the status of auto-speed mode switch 46 is considered at 210. If auto-speed mode switch is actuated, branch H is executed. If switch 46 is not actuated, the status of security mode switch 48 is considered at 212. If this switch is actuated, branch I is executed. If not, it is decided at 214 whether winter mode switch 56 is actuated. If it has been actuated, branch J is executed. If not, the status of reverse switch 50 is monitored at 216. If it is actuated, branch K is executed. If not, it is determined at 218 whether test mode switch 54 is actuated. If no, no action is taken as indicated at 220.

Returning to FIG. 10A, when light switch 30 is actuated, it is decided in branch A at 222 whether the lights are on. If not, they are turned on to a memorized intensity setting as indicated at 224. If the lights are on, it is determined at 226 whether a light fading feature is off. If this feature is not off, the lights fade off as indicated at 228. If the fading feature is off, the lights are turned off at once as indicated at 230.

When light up switch 34 is actuated, in branch B at 232 it is determined whether the lights are on. If not, no action is taken as shown at 234. If the lights are on, it is decided at 236 whether the lights are already at their maximum intensity. If yes, no action is taken as indicated at 238. If no, the intensity of the lights is gradually increased as shown at 240.

For the lamp down function, branch C determines at 242 whether the lights are on. If not, no action is taken to decrease light intensity as shown at 244. If the lights are on, it is decided at 246 whether the lights are at their minimum intensity. If yes, no action is taken to decrease intensity as shown at 248. If no, the lights are gradually decreased in intensity as indicated at 250.

When fan switch 32 is actuated, branch D decides at 252 whether the fan is on. If not, the fan is turned on to a memorized speed setting as shown at 254. If yes, the fan is shut off at once as indicated at 256.

For the fan up function, branch E decides at 258 whether the fan is on. If not, no action is taken as indicated at 260. If yes, it is determined at 262 whether the fan is already at its maximum speed. If not, fan speed is gradually increased as shown at 264. If. however, the fan is already at its maximum speed, no action is taken as indicated at 266.

When fan down is selected, branch F determines at 268 whether the fan is on. If not, no action is taken as seen at 270. If yes, it is determined at 272 whether the fan is already at its minimum speed. If not, the fan speed is gradually decreased as indicated at 274. If the fan is at its minimum speed, no action is taken as seen at 276.

When saver mode key 52 is actuated, branch G determines at 278 whether the saver function is already on. If yes, the saver mode is turned off as indicated at 280. If no, it is determined at 282 whether the lights are on. If yes, timeouts are started at 284 for timing a first period, such as one hour, at the end of which the lights are automatically turned off and a second period slightly shorter than the first period at the end of which an audio tone warning is sounded. The end of the first period is determined at 286 and the lights are automatically turned off as indicated at 288. The end of the second time period is sensed at 290 resulting in the sounding of the audio tone as indicated at 292. The operation of the timeouts at 284 also results in setting the saver mode on at 294. If it is determined at 282 that the lights are not on, the saver mode is also set on at 294. The saver mode thus automatically turns off the lights after a delay of, for example, one hour after they are turned on. Just before the delay period expires, the audio tone is sounded to warn that the lights are to be turned off. By pushing saver mode key 52, the saver mode is actuated. When saver key 52 is pushed again, the saver mode is canceled. The saver mode feature is ideal for rooms in which lights tend to be left on, such as bedrooms. It is particularly handy when children prefer to have lights on when they go to bed.

The system uses one of sixty-four address codes. While the codes are set at the factory, there are times when these codes need to be changed, such as when another ceiling fan system in the house has the same code and there is interference. When changing address codes, the control unit code setting is changed first and then the code setting of the ceiling unit. To change the control unit code setting, test button 54 is pushed and held for longer than one second. The temperature display 58 will then show the current code number (a number between 01 and 64). Using the fan speed up and down buttons 38 and 40, the code number is changed to the desired code number. Test button 54 is then pushed to return to normal operation.

To change the code setting of the ceiling unit, the power to the ceiling unit is turned off for ten seconds using power switch 95, and then the power is turned back on by closing switch 95. This programs microprocessor 90 to receive a signal resetting the ceiling unit code setting within the next five minutes. At control unit 24, test button 54 and auto-speed button 46 are pushed together. The temperature display 58 then displays "CC" (for "change code". and microprocessor 72 assembles a command sequence using the new code setting which is transmitted to the ceiling unit through transmitter 86. At the ceiling unit, the new code is stored in EEROM 92 superseding the previously stored code setting.

Figure 10C:
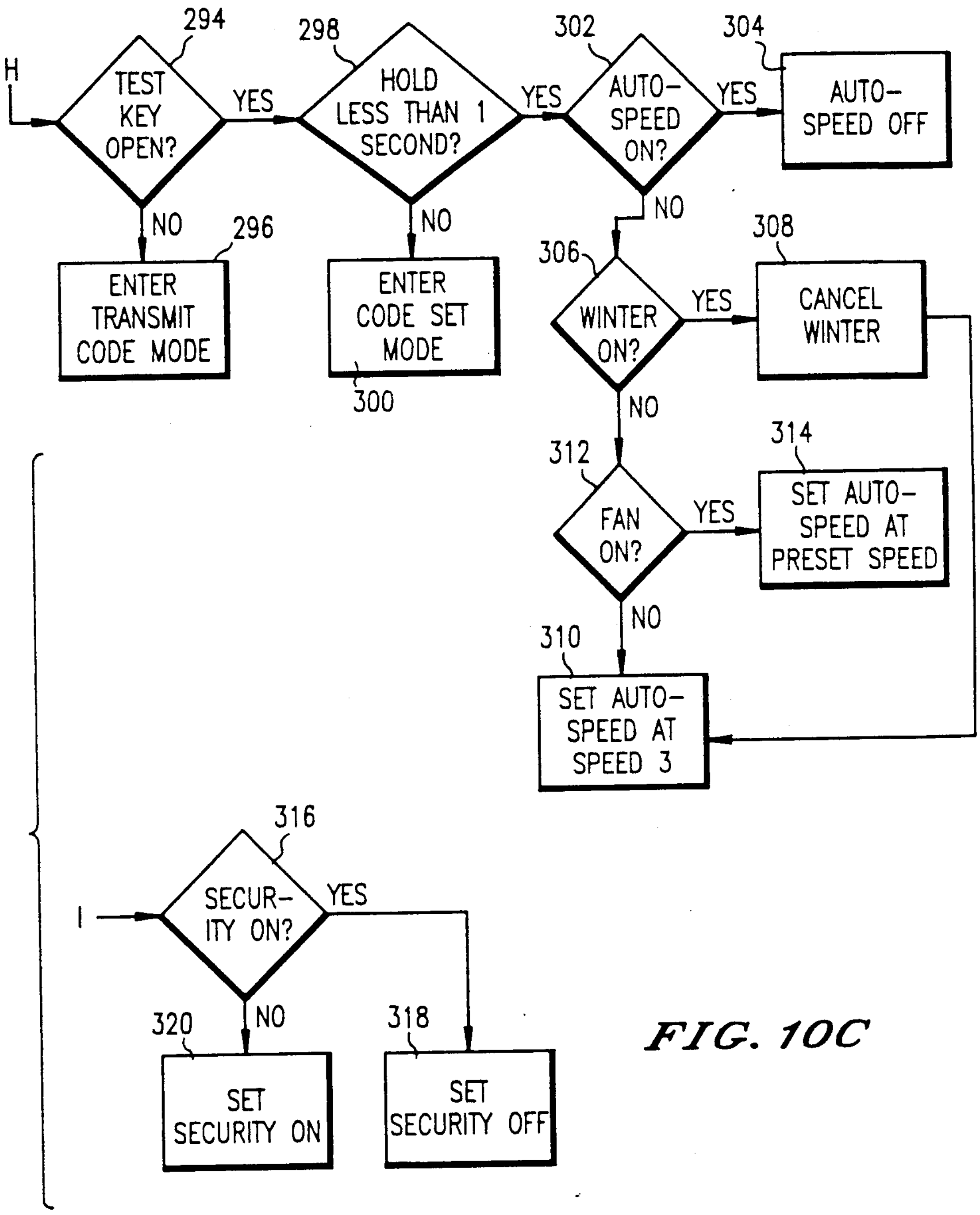

Returning to FIG. 10B, if auto-speed key 46 is actuated, branch H, as shown in FIG. 10C, determines at 294 whether test key 54 is open. If no (that is, if test key 54 is actuated), the transmit code mode is entered at 296 to transmit the code from control unit 24 to ceiling fan unit 10 as described above. If test key 54 is open, it is then determined at 298 whether test key 54 has been held for less than one second. If not (that is, if it has been held for more than one second), the code set mode is entered at 300, as described above, for entering a new code setting in control unit 24.

If test key 54 is held less than one second, it is then determined at 302 whether the auto-speed mode is on. If it is on, the actuation of auto-speed key 48 causes the auto-speed mode to turn off as indicated at 304. If the auto-speed mode is not on, it is then determined at 306 whether the winter mode is on. If yes, the winter mode is canceled at 308 and the auto-speed mode is initiated with fan speed set at speed 3, as shown at 310. It the winter mode is not on, the system then checks whether the fan is on at 312. If the fan is on, the auto-speed mode is started with fan speed at the preset speed as indicated at 314. The auto-speed mode then continues in the manner shown in FIGS. 9A and 9B.

Branch I checks at 316 whether the security mode is on. If yes, the security mode is turned off at 318. If no, the security is set on at 320. The security mode activates a security lighting program. The lights are automatically turned on and off in a random pattern designed to give the home a lived-in look.

Figure 10D:
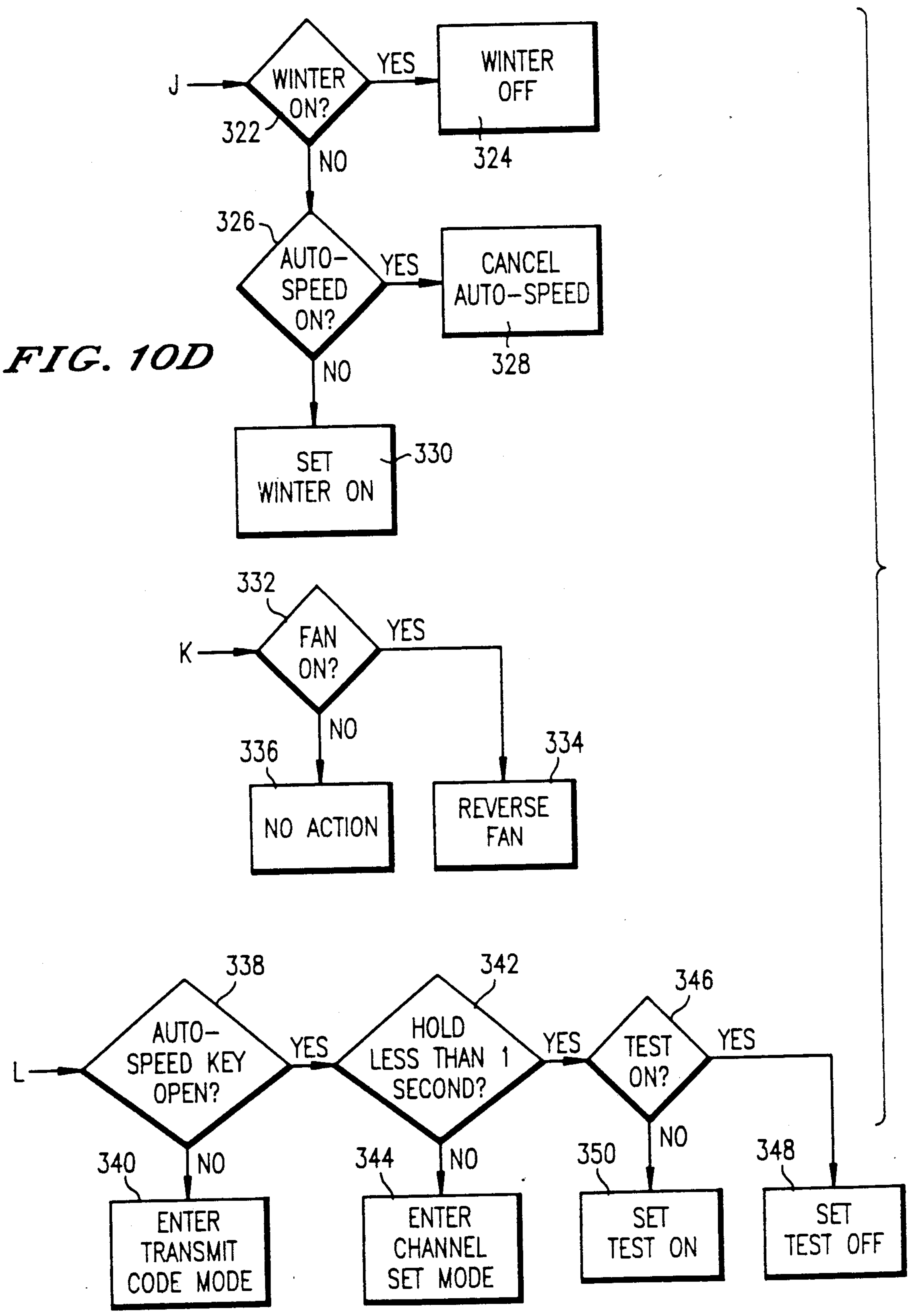

Continuing on FIG. 10D, branch J checks at 322 whether the winter mode is on. If yes, the winter mode is turned off at 324. If no, it is determined at 326 whether the auto-speed mode is on. If yes, the auto-speed mode is canceled at 328. If no, the winter mode is set on at 330.

Figure 11:
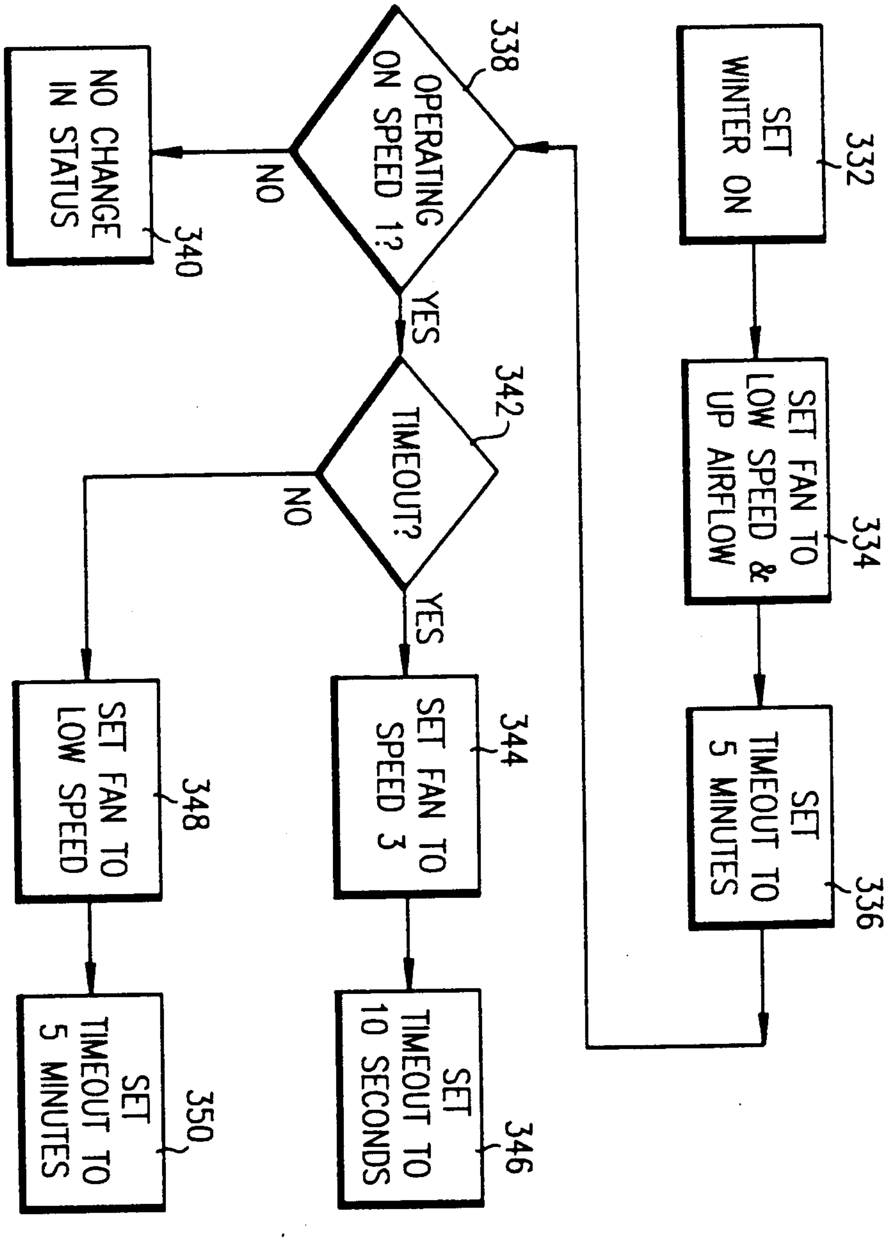

Turning to FIG. 11, when the winter mode is set on at 332, the fan is set to a low speed with upward airflow at 334. A timeout is set to five minutes at 336. It is then determined at 338 whether the fan is operating at speed 1. If not, there is no change as indicated at 340. If yes, it is then determined at 342 whether the five minute timeout is completed. If yes, the fan is set to speed 3 at 344 and a timeout is set to ten seconds at 346. If no, the fan is set to a low speed at 348 and a five minute timeout is set at 350. Thus, when the winter mode is selected, the fan blows upwardly at low speed. Every five minutes, the fan speed is increased to speed 3 for ten seconds. This is just enough to break up stratification, while the low speed keeps the air moving gently so as not to create a draft.

Returning to FIG. 10D, branch K checks at 332 whether the fan is on. If yes, the direction of fan rotation is reversed at 334. If no, no action is taken as indicated at 336.

Branch L checks at 338 whether auto-speed key 46 is open. If not, the transmit code mode is entered at 340. If yes, it is determined at 342 whether the key is held less than one second. If not, the channel or code set mode is entered at 344. Branch L is to this point a reprise of branch H, but from the viewpoint of the test key. If the key is held less than one second, it is determined whether the test mode is on at 346. If yes, the test mode is turned off at 348. If not, the test mode is set on at 350. In the test mode, the fan and lights are put through a ninety second program to test all fan and light functions.

It is sometimes convenient to provide two remote control units 24 to operate the same ceiling unit or units. Typical situations include a large room with control units 24 at both ends (this is shown in FIG. 2) and a bedroom with wall mounted and bedside control units. Because control units 24 operate autonomously, there is a problem. The ceiling unit may receive conflicting commands at random times. This problem is solved by giving each control unit a separate identification. The ceiling unit then decides which control unit is "in command". To this end, a control unit identification bit A/B is included in the command bit stream, as shown in FIG. 6, for identifying the control unit from which the command bit stream is transmitted. The command bit stream also includes a "man/auto" bit for indicating whether the transmitted command is in response to manual actuation of one of the keys or is in response to a temperature change as sensed by temperature sensor 76 with the system in the auto-speed mode. As will be shown presently, the ceiling unit responds to the control unit which was last operated manually.

Figure 12:
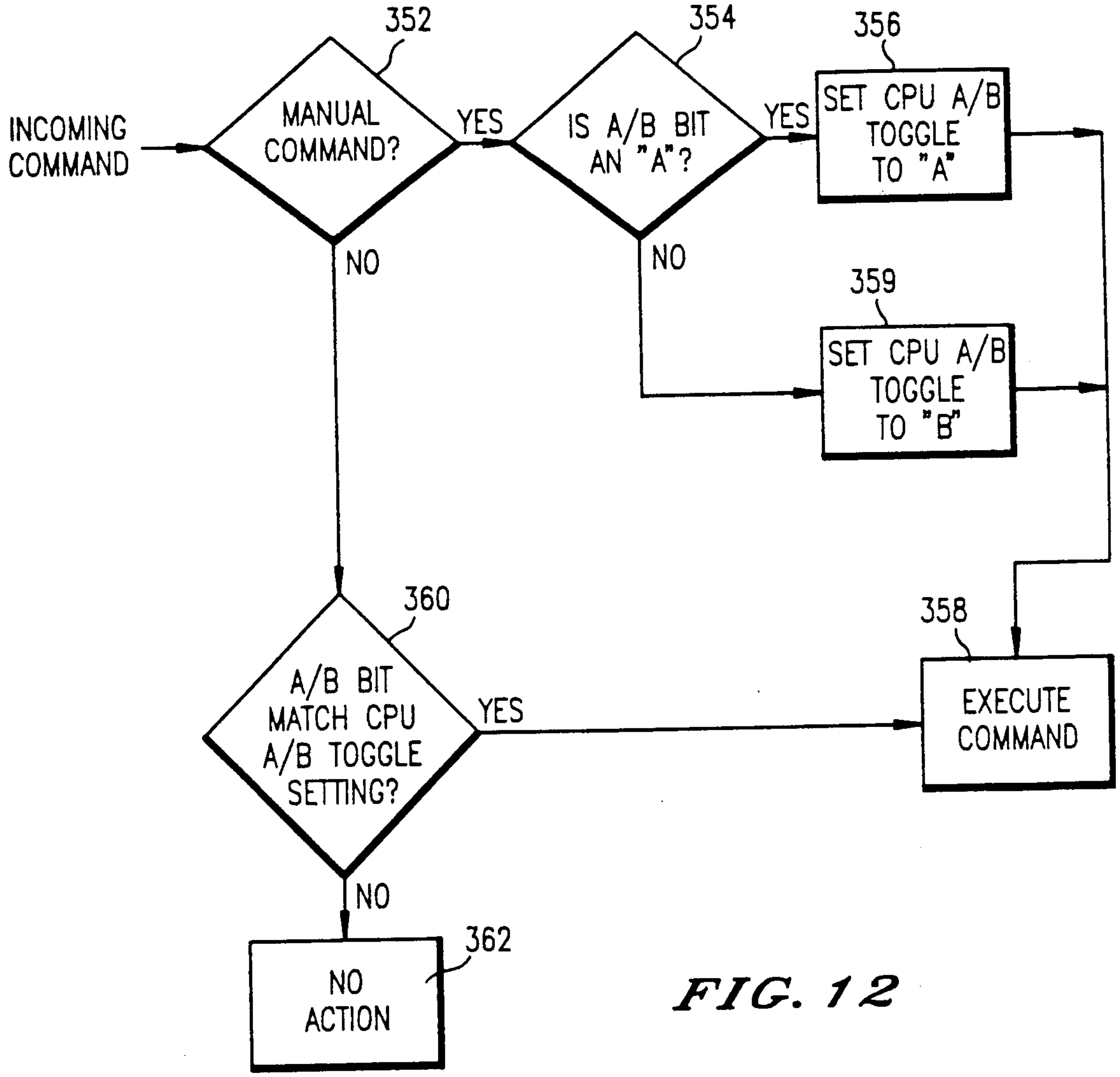

This is accomplished as shown in the flow diagram of FIG. 12. The command bit stream is received by ceiling unit 10. It is determined at 352 whether the command bit stream represents a manual command responding to the actuation of one of the keys or buttons of control unit 24. This is decided by recognizing that the "man/auto" bit signifies that the command is a manual command. If the command is a manual command, it is determined at 354 whether the "A/B" bit is an "A". If it is an "A", an "A/B" toggle in microprocessor 90 is set at 356 to "A". The command is executed at 358. If the A/B bit is not on "A", the "A/B" toggle in microprocessor 90 is set to "B" at 359. The command is then executed at 358. If the command is not a manual command (that is, is a command responding automatically to a temperature change when operating in the auto-speed mode), it is decided at 360 whether the "A/B" bit in the command bit stream matches the setting of the "A/B" toggle in microprocessor 90. If there is a match, the command is executed at 358. If the "A/B" bit does not match the setting of the "A/B" toggle, the command is ignored as shown at 362.

For two-way control, both controls must have the same channel or code setting (a number between 01 and 64), and one of the two control units must be identified by code "A", while the other is identified by code "B". In order to change the identification code of a control unit, auto-speed key 46 is held longer than one second. Temperature display 58 will then display "A" or "B" indicating the identification of the control unit. The fan speed up or down buttons 38 or 40 are pushed to change the identification.

Figure 13:
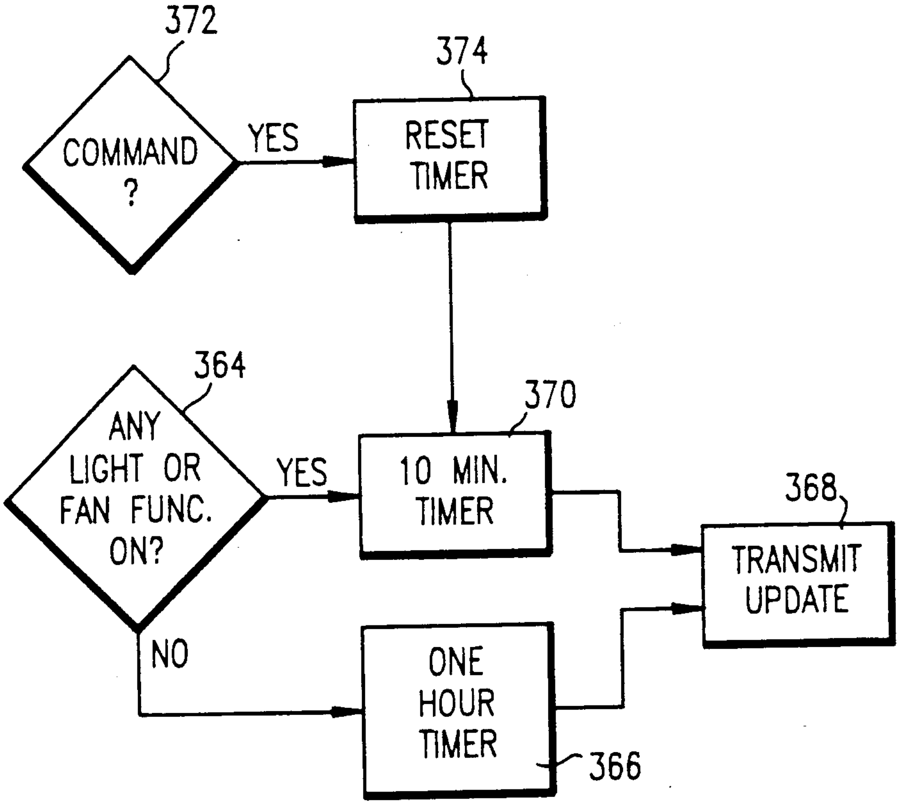

When no functions are requested from a control unit (that is, the fan, the lights and all functions are off), an update is transmitted to the ceiling unit every hour to insure that the memory of ceiling unit microprocessor 90 has correct information. This makes possible complete recovery from power failures and boosts the accuracy of the system to simulate the accuracy of a closed loop system. When the fan, the lights or any of the functions are on, the updates are transmitted every ten minutes, the ten minute timer being reset any time a transmission is called for by a temperature change or by manual operation of one of the keys or buttons. This operation is illustrated by the flow chart of FIG. 13. It is decided at 364 whether any light or fan functions are on. If not, a timer in microprocessor 72 generates a control signal every hour at 366 to transmit an update at 368. If yes, a timer in microprocessor 72 generates a control signal every ten minutes at 370 to transmit an update at 368. In the event a command is transmitted, whether manual or automatic, as determined at 372, a timer reset signal is developed at 374 to reset the timer at 370.

Although the present invention has been described with reference to a particular embodiment, it is to be appreciated that various adaptations and modifications may be made and that the invention is only to be limited by the appended claims.

The invention claimed is:

1. A remote control system for a ceiling unit including a combined ceiling fan and light fixture, comprising:

a control unit remote from said ceiling unit, said control unit, including first microprocessor means, temperature sensor means for coupling a digital representation of temperature in a room containing said ceiling unit to said first microprocessor means, said first microprocessor means computing an automatic command in response to said digital representation of temperature in accordance with a comparison to a base temperature, manual entry means for manually inputting a manual command to said first microprocessor means and transmitter means controlled by said first microprocessor means for transmitting a digital signal in accordance with the automatic command and manual command comprising a number of control bits including light fixture control bits for controlling the energization and intensity level of said light fixture and fan control bits for controlling the energization, speed and direction of said ceiling fan; and said ceiling unit comprising receiver means for receiving said transmitted digital signal and providing a digital data signal corresponding thereto, a second microprocessor means receiving said digital data signal, a source of AC power, first switch means connecting said light fixture across said source of AC power, said second microprocessor means controlling said first switch means to energize said light fixture and including means to control light level in accordance with said light fixture control bits and fan switch means for connecting said fan across said source of AC power and for selecting a fan speed and direction in accordance with said fan control bits.

2. The system of claim 1, wherein said system comprises two control units A and B at spaced locations, and wherein said transmitted digital signal comprises a "manual/automatic" bit to indicate whether a command is a manual command input through said manual entry means or an automatic command computed by said first microprocessor means from said digital representation of temperature and an "A/B" bit to identify the control unit transmitting said signal, said second microprocessor means determining whether a "manual/automatic" bit indicates a manual command or an automatic command, and when a manual command is indicated, said second microprocessor determining whether an "A/B" bit indicates control unit A or control unit B, setting a toggle to "A" if control unit A is indicated or to "B" if control unit B is indicated, and executing said command and, when an automatic command is indicated, said second microprocessor determining whether said A/B bit matches the setting of said toggle, ignoring said command if it does not match the setting of said toggle, and executing said command if it matches the setting of said toggle.

3. A system of claim 1, said system having a "winter" mode wherein said second microprocessor means controls said fan switch means and said fan direction to set said fan to blow upwardly alternately at a low speed for a first period of several minutes and at a higher speed for a second shorter period of several seconds, whereby air stratification is broken up.

4. A system of claim 3 wherein said first period is five minutes and said second period is ten seconds.

5. A system of claim 1, said system having an "autospeed" mode wherein said first microprocessor means controls said temperature sensor means to measure the temperature in said room periodically, computes the average of a number of the most recent temperature readings, determines the difference between the computed average and a selected base temperature, determines a target speed based on said temperature difference, and generates a command to adjust the fan speed to said target speed.

6. A system of claim 5, wherein said temperature is measured at intervals of at least thirty seconds, and the most recent three temperature readings are averaged.

7. A system of claim 1, wherein said first microprocessor means, when no functions are selected through said manual entry means, and said fan and light fixture are off, transmits an update to said ceiling unit at first periodic intervals, and when a function is selected through said manual entry means, or said fan or light fixture is off, transmits an update at second periodic intervals which are shorter than said first periodic intervals, said second periodic intervals being reset whenever an automatic command computed by said first microprocessor means from said digital representation of temperature or a manual command input through said manual entry means is transmitted by said control unit.

8. A system of claim 7, wherein said first periodic interval is one hour and said second periodic interval is ten minutes.

9. A system as recited in claim 1, wherein said fan switch means comprises controlled rectifier switches, and wherein said ceiling unit comprises a zero crossing detector coupled to said source of AC power and providing an input to said second microprocessor means as to the timing of zero crossing of said source of AC power, said second microprocessor means triggering the controlled rectifier switches just before said timing of a zero crossing through a triggering period ending just after said timing of a zero crossing.

10. A system of claim 9, wherein said triggering period is one microsecond beginning 0.5 microsecond before said timing of a zero crossing.

11. A system of claim 9, wherein said controlled rectifier switches are triacs.

12. A system of claim 9, wherein said fan is connected across said source of AC power through a reversing switch and a plurality of series connected resistors, said controlled rectifier switches shunting individual ones of said series connected resistors to ground, the firing of a controlled rectifier switch thereby selecting the magnitude of resistance in series with said fan to determine the speed thereof.

13. A system of claim 1, wherein said manual entry means includes means to select an "auto-speed" mode in which an "automatic" command is generated in response to changes in the temperature in said room or a "winter mode" for controlling said fan in a manner suitable for the winter, said first microprocessor means, if said "auto-mode" has been selected, canceling said "auto-speed" mode in response to selection of said "winter mode".

* * * * *